July 24, 1951  A. GORDON  2,561,507
SEPARATOR
Filed Sept. 10, 1948  2 Sheets-Sheet 1
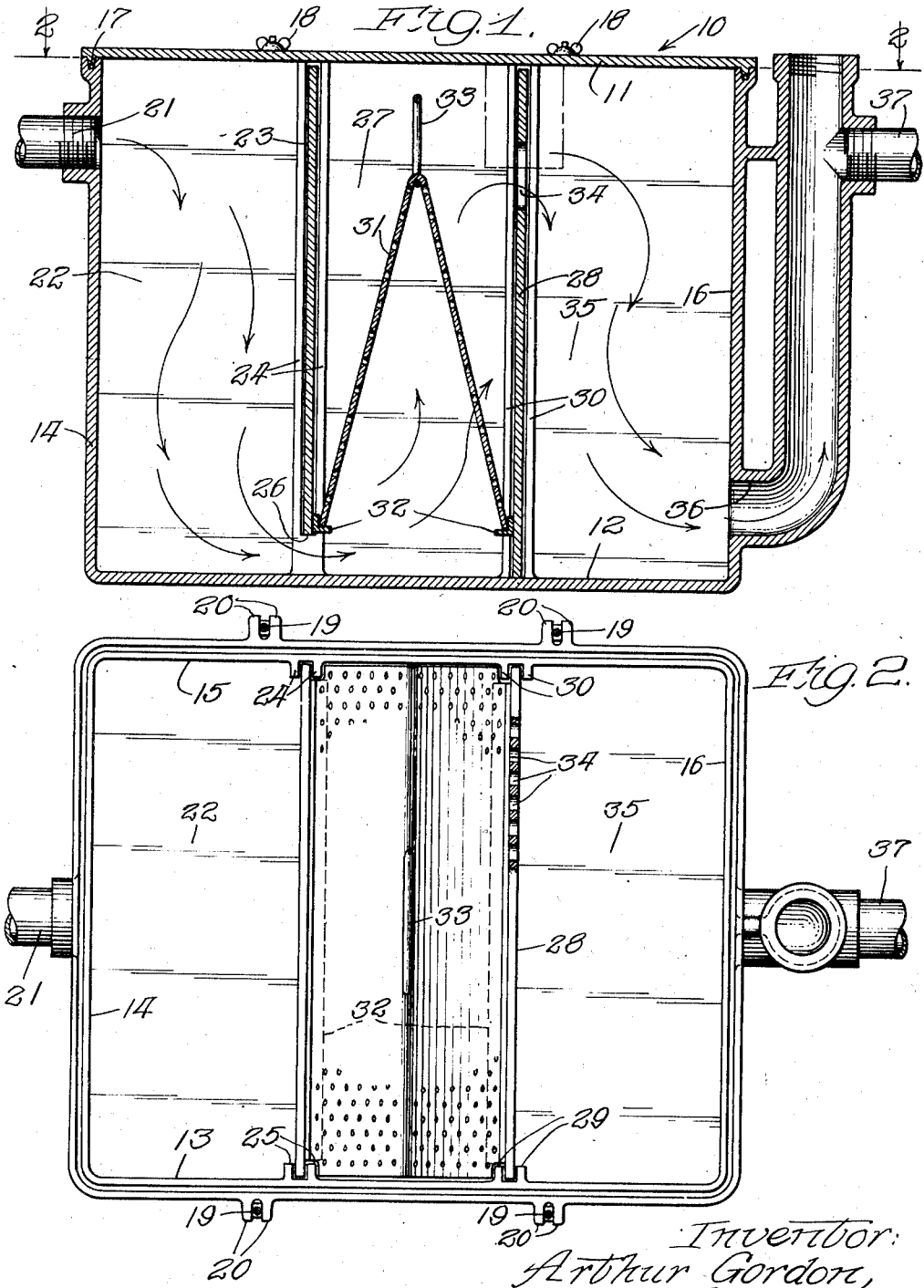
Inventor:
Arthur Gordon,
By Chritton, Schroeder,
Merriam, Hofgren, Attys.

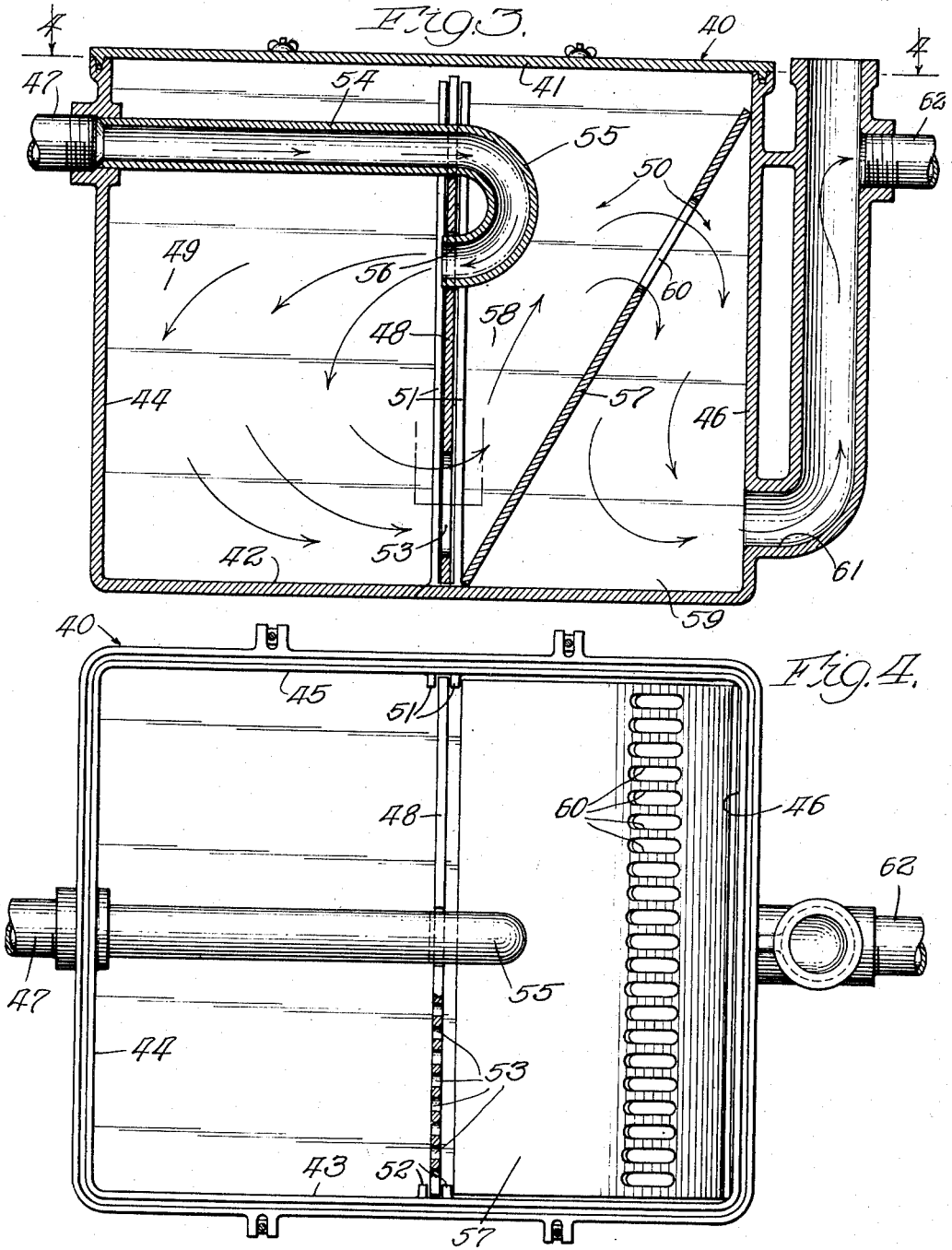

Patented July 24, 1951

2,561,507

UNITED STATES PATENT OFFICE 2,561,507

SEPARATOR

Arthur Gordon, Chicago, Ill.

Application September 10, 1948, Serial No. 48,701

8 Claims. (Cl. 210—43)

This invention relates to a liquid separator.

It is a general object of this invention to produce a liquid separator of improved design and increased efficiency.

It is a more specific object of this invention to provide a liquid separator having no pockets wherein solid material may collect to clog the apparatus.

It is a further object of this invention to provide a liquid separator wherein the liquid flow is so directed and controlled as to have a sweeping action to move all solids therethrough.

It is a further object of this invention to produce a liquid separator whose parts are easily accessible and removable for cleaning.

Other and further objects of this invention will be apparent from the following specification and drawing in which Fig. 1 is a vertical section through a liquid separating apparatus embodying the invention and Fig. 2 is a horizontal section along line 2—2 of Fig. 1. Fig. 3 is a view like Fig. 1 of a modified form of the device and Fig. 4 is a horizontal section along line 4—4 of Fig. 3.

While the invention is susceptible of various modifications and alternative constructions, it is herein shown and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

Referring now to Figs. 1 and 2, I show a separator comprising a casing 10 having a top 11, a bottom 12, and sidewalls 13, 14, 15 and 16. A seal 17 is provided about the top of the sidewalls to seal the top 11 thereto, this latter member being drawn tightly against the sidewalls by means of thumb screws 18 secured to bolts 19 on the sidewalls and engaging pairs of spaced fingers 20 on the top. The casing is provided with an inlet 21 located near the upper part of sidewall 14 which opens into an inlet compartment 22 defined by the sidewall 14 and a baffle plate 23 extending transversely of the casing as shown. The baffle plate is removably held between channel members 24 and 25 attached to the sidewalls 15 and 13 respectively and is provided with a bottom edge 26 spaced above the bottom 12 of the separator to provide a liquid passage thereunder. All fluid entering the inlet chamber 22 from the inlet 21 passes under the edge 26 of the baffle plate and into a screening compartment 27.

The screening chamber is defined between baffle plate 23 on the one side and a second baffle plate 28 on the other side. The plate 28 is mounted in a manner similar to the plate 23 in that it is removably held between channel members 29 and 30 located on the sidewalls 13 and 15 respectively. Located in the screening compartment 27 is an inverted V-shaped screen 31 which is supported upon shoulders 32 and 33 secured to the baffle plates and which may be removed from the screening compartment by means of a handle 33 secured to the apex of the V.

The baffle plate 28 is provided with a plurality of openings 34 near the top thereof and liquid upon entering the screening compartment and passing through the screen 31 may enter an outlet compartment 35 through the openings 34. Located near the bottom of the compartment 35 is a passage 36 leading upwards to an outlet 37.

I have found that a separator designed as just described eliminates one of the most troublesome difficulties encountered in the operation of liquid separators. That difficulty is the piling up of solids in pockets or eddies of the device which causes a blockage of the flow of liquid through the separator. It will be noted that solids entering the inlet compartment and settling to the bottom thereof are directly in the path of liquid flowing along the bottom of that compartment and under the baffle plate 23. The liquid thus acts to sweep all solids into the screening compartment 27. The flow of liquid in this latter compartment is again across the bottom thereof and upwards through the screen member 31 and solids too large to pass through the openings in the screen and settling to the bottom of the screening compartment during periods of rest are reagitated when additional liquid enters the device. Similarly, in the outlet compartment 35 solids which tend to pile up on the bottom are swept into the outlet passage 36 by liquid during its motion through the separator. It can be seen then that I direct the flow of liquid through my separating apparatus in a manner as to cause it to sweep the entire device free of clogging solids and to agitate and reagitate those solids until they are sufficiently broken down to pass through the openings in the screen. Solids are not permitted to pack up in any part of the separator.

A somewhat different embodiment of my invention is shown in Figs. 3 and 4 but the principle of the sweeping action to which I have just referred is preserved.

Referring now to Figs. 3 and 4, the separator 40 is provided with a top 41, a bottom 42, and sidewalls 43, 44, 45 and 46. The top is held to the sidewalls in the same manner as was the top in the previous embodiment and the device is provided with an inlet 47 located near the top of the sidewall 44. A baffle plate 48 divides the separator into an inlet section 49 and an outlet section 50. The plate 48 is removably held in channels 51 and 52 as shown and is provided with a plurality of openings 53 located near the bottom edge of the plate, that is, near the bottom 42 of the container. Secured to the inlet 47 is a pipe 54 which extends through a slot in the baffle plate 48 to a gooseneck portion 55 which returns through the plate and opens at 56 to the inlet section 49. The purpose of the pipe and gooseneck is to direct incoming liquid against the sidewall 44 so that the flow of liquid is generally in the direction of the arrows to sweep all solid particles which may have settled to the bottom of the inlet section against and through the openings 53 and into the outlet section 50.

The outlet section is divided by an inclined plate 57 into a screening compartment 58 and an outlet compartment 59. The plate bisects the outlet section having its lower edge resting against the bottom 42 of the separator while its upper edge rests against the sidewall 46 at a position above the normal liquid level in the device. Adjacent the upper end of the plate 57, I provide a plurality of openings 60 through which liquids and solids may pass into the outlet compartment 59 from whence they are led via a passage 61 to an outlet 62.

The pipe 54 is removably secured to the inlet 47 so that it easily may be removed to permit withdrawal of the plate 48 for cleaning. I find that it is not necessary to weld or otherwise secure the inclined plate 57 in position in the outlet section. I construct this plate of metal so that its own weight is sufficient to maintain it in position and hence it also may be easily removed for cleaning if found necessary.

I claim:

1. A liquid separator comprising a casing having a top, a bottom, and sidewalls, an inlet to and an outlet from the casing located near the top of opposite sides of the casing; a baffle plate etxending across the casing transversely of the flow of liquid therethrough, said baffle plate providing an opening adjacent the bottom of the casing and directing liquid from the inlet through the opening, a screening compartment in the casing including means for directing in an upward direction all liquid passing through said opening and into said screening compartment, an outlet compartment connected to the screening compartment, a screen in said casing ahead of the outlet compartment and a passage near the bottom of the outlet compartment leading upwardly to the outlet.

2. The liquid separator of claim 1 in which said baffle plate has its lower edge spaced above the bottom of the casing.

3. The liquid separator of claim 2 in which said directing means includes a second baffle plate extending across the casing parallel to and spaced from the first baffle plate, said second baffle plate being provided with an opening near its top with the screen located between the baffle plates.

4. The liquid separator of claim 3 in which said screen is in the shape of an inverted V removably supported by said baffle plates.

5. The liquid separator of claim 1 in which said directing means includes an inclined plate and said screen comprises a foraminous portion of the inclined plate.

6. A liquid separator comprising a casing having a top, a bottom, and sidewalls, an inlet to and an outlet from the casing located near the top of opposite sides thereof; a baffle plate extending across the casing transversely of the flow of liquid to divide the casing into an inlet section and an outlet section, said baffle plate providing an opening near the bottom of the casing and directing all liquid from the inlet through the opening, an inclined plate in the outlet section having a foraminous portion and dividing said section into a screening compartment and an outlet compartment and a passage in the outlet compartment leading upwardly to the outlet.

7. The liquid separator of claim 6 including a pipe in the inlet section connected to the inlet, said pipe being curved to direct entering liquid against the sidewall in which the inlet is located.

8. A liquid separator comprising a casing having a top, a bottom, and side walls, an inlet to and an outlet from the casing located near the top of opposite sides thereof; a baffle plate extending across the casing transversely of the flow of liquid therethrough to divide the casing into an inlet section and an outlet section, said baffle plate having a plurality of openings near its bottom edge to direct all liquid from the inlet therethrough and a pipe connected to the inlet and extending through the baffle plate, said pipe having a gooseneck portion returning through said baffle plate to the open end of the pipe to direct entering liquid against the sidewall in which the inlet is located.

ARTHUR GORDON.

REFERENCES CITED

The following references are of record in the file of this patent:

UNITED STATES PATENTS

| Number | Name | Date |
| --- | --- | --- |
| 617,057 | Sieben | Jan. 3, 1899 |
| 1,889,601 | Heinkel | Nov. 29, 1932 |
| 1,959,623 | Gordon | May 22, 1934 |
| 2,059,844 | Boosey | Nov. 3, 1936 |
| 2,070,202 | Gordon | Feb. 9, 1937 |
| 2,099,061 | Gordon | Nov. 16, 1937 |
| 2,216,300 | Shenk | Oct. 1, 1940 |
| 2,464,976 | Gordon | Mar. 22, 1949 |